Dec. 14, 1965 R. N. ESHOM 3,222,792
TEMPLATE FOR MARKING CORNER CUTS OF A MOLDING
Filed March 21, 1963 2 Sheets-Sheet 1
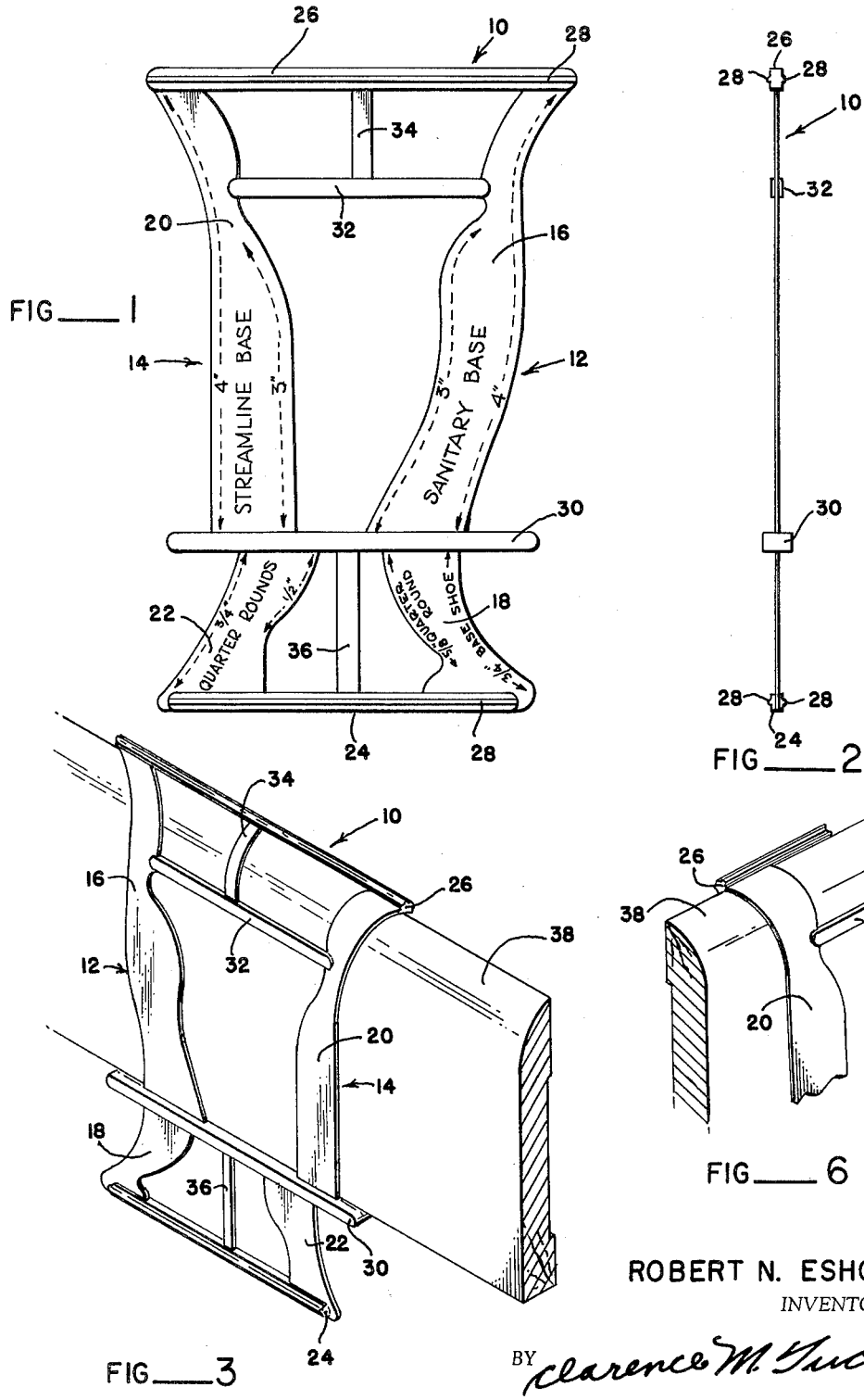
ROBERT N. ESHOM
*INVENTOR.*
BY Clarence M. Tuck
*ATTORNEY.*

Dec. 14, 1965 R. N. ESHOM 3,222,792
TEMPLATE FOR MARKING CORNER CUTS OF A MOLDING
Filed March 21, 1963 2 Sheets-Sheet 2
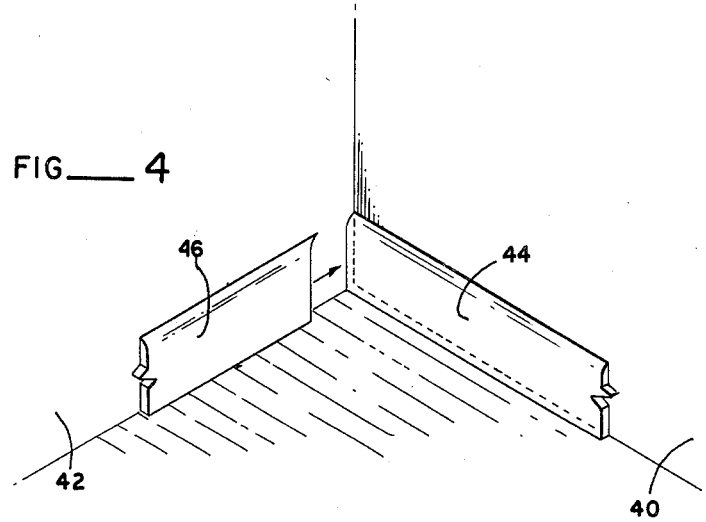
FIG__4
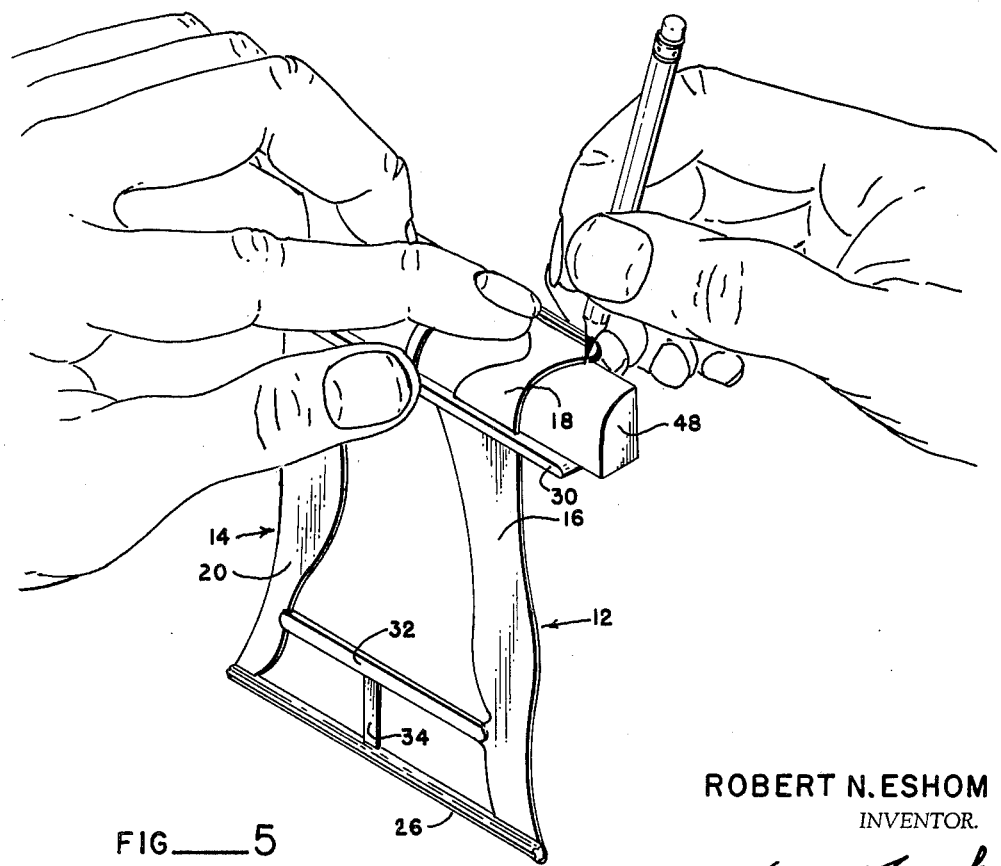
FIG__5
ROBERT N. ESHOM
INVENTOR.
BY Clarence M. Tuck
ATTORNEY.

United States Patent Office 3,222,792
Patented Dec. 14, 1965

3,222,792
TEMPLATE FOR MARKING CORNER CUTS
OF A MOLDING
Robert N. Eshom, 222 E. 9th St., Port Angeles, Wash.
Filed Mar. 21, 1963, Ser. No. 267,002
5 Claims. (Cl. 33—174)

This invention relates to a new and useful template for marking corner cuts for various types of moldings used in house construction and more particularly to a template which is in effect several templates contained in one, thus having multiple curves to mark a wide range of standard moldings which are installed at the bases of walls in houses and buildings.

One of the problems inherent it the installation of any one of the numerous standard molds in the room of a house or building has been the time required in measuring and cutting, with the aid of a miter box, the corner cuts of the molding.

The molding for any corner of adjacent walls necessitates first measuring the mold and then taking it to a miter box and cutting to a 45-degree angle. Similarly, the adjacent mold must then be marked, measured and cut in the miter box to a 45-degree angle in order to achieve an attractive joint of the two adjacent molds. This process must be gone through for each corner. In the event the carpenter does not want to cut both of the abutting molds he must first use the 45-degree miter cut to determine his curve. After the 45-degree miter has been made he then uses a coping saw to finish cut the end of the mold to conform to the configuration of the adjacent or abutting mold.

It can be appreciated that the miter box is a heavy piece of equipment and is usually left in one room. The workman must drag a long piece of molding to the miter box, make his miter and then make his second or cope cut. A coping saw is, of course, a small tool and if cutting of the molds can be confined to the coping saw much trouble in dragging the molding from room to room would be eliminated. Resultant savings in time and labor costs are then realized.

It is a prime purpose of this invention to eliminate the need for a miter box and to make it possible for the carpenter or workman to mark the appropriate curves on the end of the molding, make one coping saw cut per corner and then install the molding.

Accordingly it is an object of this invention to provide a multiple mold marking template which is simple in design, easy to manufacture and convenient to use.

Another object of this invention is to provide a multiple mold marking template which eliminates the use of a miter box and which reduces the number of cuts required on a mold for a corner from two to one.

Still another object of this invention is to provide a multiple mold marking template which will permit the carpenter or workman to produce a neat, attractive mold fit or joint which is fully comparable to those which can be achieved by the use of a miter box.

Another object of this invention is to provide a multiple mold marking template which saves time and therefore reduces labor costs.

A further object of this invention is to supply a multiple mold marking template which requires less effort than has hitherto been demanded in installing moldings in buildings.

Other objects and advantages of this invention will become apparent in the subsequent disclosure and claims. Reference will be had to the accompanying drawings which form a part of this specification and in which like numerals refer to like parts throughout, and in which:

FIGURE 1 is a front view of this template showing the manner in which curved configurations for different molds are designed into the template;

FIGURE 2 is a side view showing that the template is essentially of a thin sheet material with heavier reinforcing and rigidizing sections;

FIGURE 3 shows the manner in which the template would be applied to mark a piece of four inch streamline base molding;

FIGURE 4 shows diagrammatically how two pieces of molding would be cut and joined in a corner in order to form an attractive joint of two adjacent or abutting moldings;

FIGURE 5 shows how a short portion of the template would be applied to mark an end cut of a piece of ¾-inch baseshoe molding; and FIGURE 6 shows how the template can be reversed to make a cut on the opposite end of a length of streamline base molding.

Referring now to FIGURES 1 and 2, it will be seen that the template, generally designated by the number 10 and drawn to scale, is generally composed of two elongated irregularly shaped strips 12 and 14. The two strips 12 and 14 are placed in edge-to-edge spaced-apart relationship so that they are coplanar but so that the distance between them varies. Strip 12 has a longer portion 16 and a shorter portion 18, while strip 14 has a longer portion 20 and shorter portion 22. Strips 12 and 14 are approximately of equal length and are connected at the ends thereof by connecting bar 24 and 26. The connecting bars 24 and 26 are of slightly greater thickness than the strips 12 and 14 and have as their purpose, of course, to make a single template of the numerous or multiple curves which are formed on to the edges of the strips 12 and 14. Each of the bars 24 and 26 on the front and back faces thereof have the elongated ridges 28 extending along the entire length and along the center of each side and raised slightly above the body of the bar itself.

Approximately one-quarter of the distance from bar 24 to bar 26 is a guide bar 30, which interconnects the two strips and which also extends outwardly beyond the outer edges of the two strips. Guide bar 30 is roughly twice as thick as the connecting bars 24 and 26 and forms the dividing line between the portions 16 and 18 of strip 12 and portions 20 and 22 of strip 14. Spaced inwardly from the guide bar 26, which is at the outer end of the long portions of the strips, is a reinforcing bar 32 located generally parallel to connecting bar 26. Extending between reinforcing bar 32 and connecting bar 26 is rigidizing bar 34. Similarly on the short portion end of the strips between guide bar 30 and connecting bar 24 is rigidizing bar 36. In both cases rigidizing bars 34 and 36 extend generally normal to the guide and connecting bars and are placed approximately midway between the facing edges of the strips. It will be appreciated that the connecting bars 24 and 26 and the guide bar 30 are all approximately parallel with each other. In like manner the reinforcing bar 32 is also substantially parallel with the guide and connecting bars. The reinforcing bar and the rigidizing bars obviously have the purpose of preventing distortion of the template.

Template 10, as shown in FIGURE 1, has the strips 12 and 14 shaped so that curved lines can be drawn on appropriate pieces of molding. When the curve is cut with a coping saw such cut will match the front or outward configuration of the piece of molding with which it is intended to join. Most lumber suppliers, yards, and dealers will stock at least eight standard mold designs. The instant invention is intended to supply marking curves for those eight standard designs. On the outside of the long portion of strip 12 the curve is formed to a 4-inch sanitary base type molding. Likewise on the inner edge of the long portion 16 of strip 12 the curve outlines the required cut necessary for the 3-inch sanitary base. The inside edge of long portion 20 is for a 3-inch streamline base, while the outside edge is for 4-inch streamline base. On the shorter portions 18 and 22 the outside edge of 18 is curved for ¾-inch baseshoe molding, the inside edge of short portion 18 is for ⅝-inch quarter round, the inside edge of short portion 22 of strip 14 is for ½-inch quarter round, while the outside edge is for ¾-inch quarter round.

FIGURE 3 shows how the template is flexed against a piece of 4-inch streamline base molding in order to draw the proper curve for an end cut. Guide bar 30 catches the bottom edge of the streamline base molding 38 while the long portion of the template is flexed over the molding itself. Note that the upper connecting bar 26 and the ridges 28 give enough rigidity to the end of the template to permit light finger pressure on connecting bar 26 to force strip 20 tightly against molding 38. In order to cut the opposite end the template need only be turned over to present the appropriate curve to the proper position.

FIGURE 4 shows that on one wall 40 the mold 44 need only be square cut at each end to fit against the base of the wall. The molding 46 at the base of wall 42 will have an end cut to match the configuration of molding 44.

FIGURE 5 shows using the short portion of the template to mark a cut on a piece of ¾-inch baseshoe molding. The example shown in FIGURE 5 indicates that only light finger pressure is needed to hold the guide bar on the bottom surface of molding 48 and to flex the short portion of the template around the outside curve surface of molding 48. The ridges 28 on both of the connecting bars 24 and 26 are an extra rigidifying feature but they do also help to uniformly force the particular end of the template toward the upper back edge of the molding which is being marked.

It is contemplated that the template of this invention could be made of a plastic material, synthetic rubber or even thin metal sheet. So long as the material used is non-stretchable and flexible it serves the purpose. It has been found that a thin plastic material of perhaps 1/32 of an inch in thickness serves very adequately.

The foregoing is considered as illustrative only as the principle of this invention. Numerous modifications and changes will readily occur to those skilled in the art, and it is not desired to limit the invention to the exact construction and operation shown and described. Accordingly all suitable modifications and equivalents may be resorted to falling within the scope of the invention.

What is claimed is:

1. A template for marking corner cuts on moldings and the like, comprising: at least two elongated, irregularly shaped, spaced-apart strips of relatively thin, flexible, non-stretchable sheet material, said strips being interconnected at each end thereof by generally parallel connecting bar means; guide bar means being thicker than and interconnecting said strips and being generally at a predetermined distance from both of said connecting bar means; and each of said strips having curve configurations on each edge thereof on each portion thereof between said guide bar means and each of said connecting bar means.

2. A template for marking corner cuts on moldings and the like, comprising: a pair of irregularly shaped spaced-apart strips of relatively thin, flexible, non-stretchable sheet material, said strips being interconnected at each end thereof by first supporting and rigidizing bar means having ridge portions thereon along the length thereof; a second guide bar means being thicker than and interconnecting said strips and being generally closer to one of said first bar means than to the other and also being generally parallel to both of said first bar means; and each of said strips having curve configurations on each edge thereof on each portion thereof between said second bar means and each of said first bar means; all of the curve configurations being different from each other.

3. A template for marking corner cuts on moldings and the like, comprising: a pair of elongated irregularly shaped, spaced-apart strips of relatively thin, flexible, non-stretchable sheet material, said strips being so positioned with respect to each other as to lie in edge-to-edge relationship in approximately the same plane; said strips being interconnected at each end thereof by a supporting bar means each of which is of slightly greater thickness than said strips; a guide bar means of substantially greater thickness than said strips interconnecting said strips in generally parallel relationship to said supporting bars and in closer proximity to one than the other of said supporting bar means; and each of said strips having curve configurations on each edge thereof between each of said supporting bar means and said guide bar means.

4. A template for marking corner cuts on moldings and the like, comprising: a pair of elongated irregularly shaped, flat, spaced-apart strips of relatively thin, flexible, non-stretchable sheet material in which the strips are of the same general length and positioned in edge facing relationship in approximately the same plane and in which the distance between said edges varies; said strips being interconnected at each end thereof by a connecting bar means each of which is of slightly greater thickness than said strips; a guide bar means of substantially greater thickness than said strips and interconnecting said strips in generally parallel relationship to each of said connecting bar means, said guide bar means being positioned approximately one-fourth to one-third the distance from one to the other of said connecting bar means; and each of said strips having curve configurations on each edge thereof between each of said supporting bar means and said guide bar means.

5. A template for marking corner cuts on moldings and the like, comprising: a pair of elongated, irregularly shaped, flat, spaced-apart strips of relatively thin, flexible, non-stretchable sheet material in which the strips are of the same general length and positioned in edge facing relationship in approximately the same plane and in which the distance between said facing edges varies; said strips being interconnected at each end by a connecting bar means each of which is of greater thickness than said strips; a guide bar means of greater thickness than said connecting bar means in generally parallel relationship to each of said connecting bar means, said guide bar means being positioned approximately one-fourth the distance from one to the other of said connecting bar means to thereby define corresponding long portions and short portions in said pair of strips; and each of said strips having curve configurations on each edge thereof of each of said short and long portions.

References Cited by the Examiner

UNITED STATES PATENTS

| 1,125,010 | 1/1915 | Doner | 33—90 |
| 2,511,465 | 6/1950 | Fournet | 33—174 |
| 2,560,756 | 7/1951 | Bollons | 33—174 |
| 3,128,560 | 4/1964 | McKenzie | 33—174 |

ISAAC LISANN, *Primary Examiner.*

LEONARD FORMAN, *Examiner.*